Figure 7:
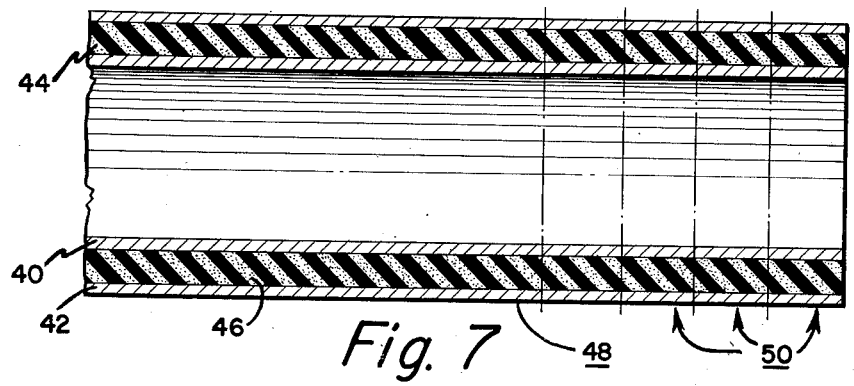

July 9, 1957   C. H. BEARE   2,798,257
METHOD OF MOLDING
Filed April 7, 1953   2 Sheets-Sheet 1
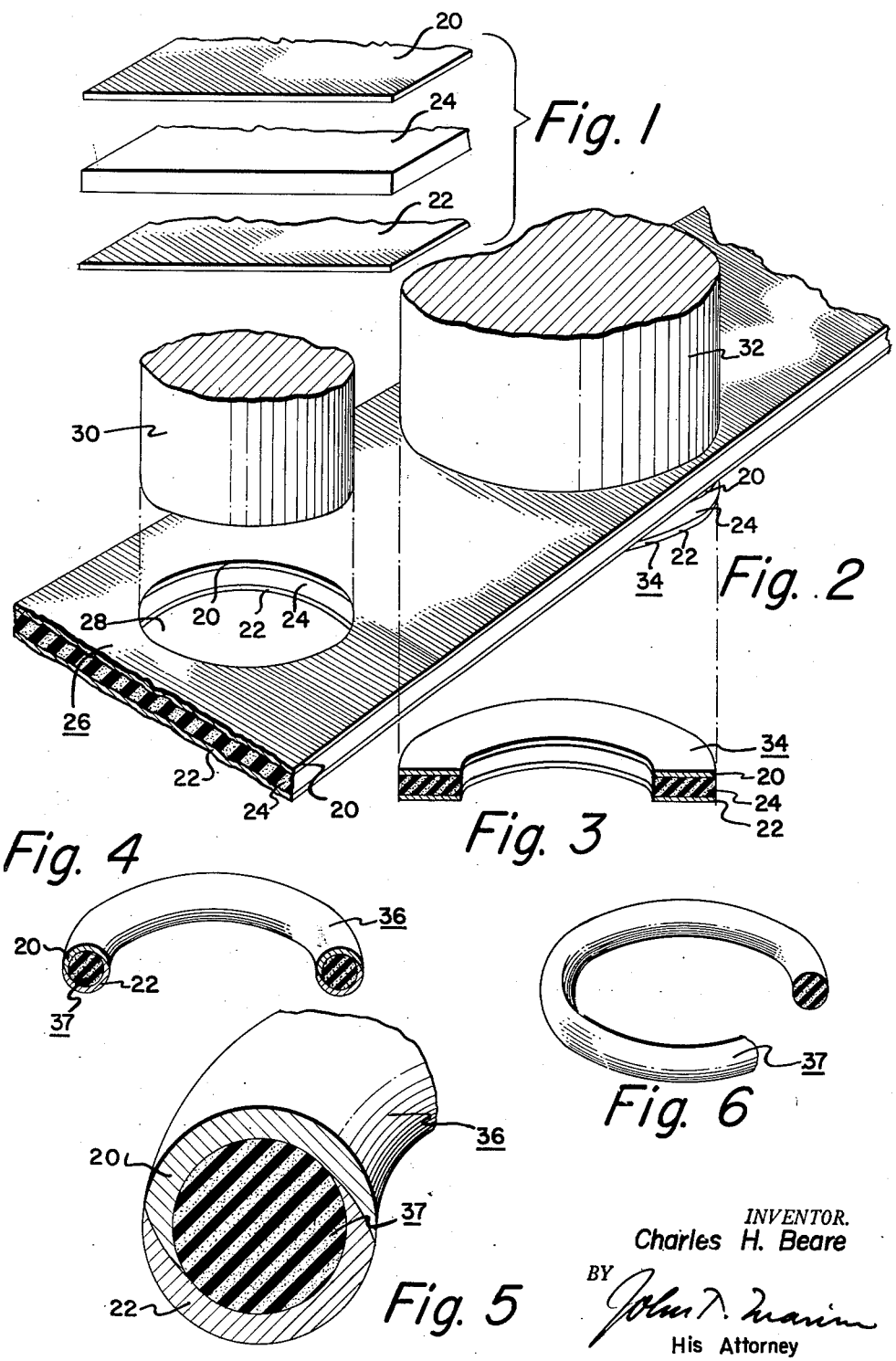
INVENTOR.
Charles H. Beare
BY
His Attorney July 9, 1957 — C. H. BEARE — 2,798,257
METHOD OF MOLDING Filed April 7, 1953 — 2 Sheets-Sheet 2

INVENTOR.
Charles H. Beare
BY
His Attorney

United States Patent Office 2,798,257
Patented July 9, 1957

2,798,257

METHOD OF MOLDING

Charles H. Beare, Dayton, Ohio, assignor to General Motors Corporation, Detroit, Mich., a corporation of Delaware Application April 7, 1953, Serial No. 347,285

3 Claims. (Cl. 18—55)

This invention relates to an article and to method for making same and more particularly to a method whereby elastomeric material may be formed and cured in a destructable mold.

It is an object of this invention to provide a method for molding plastic materials within a destructable mold adapted to eliminate mold flash from the subsequently formed article.

Another object of the present invention is to form an elastomeric seal within a destructable mold adapted to mold the surface of the seal free from mold flash.

A further object of the present invention is to mold an article without mold flash from elastomeric and other plastic materials in a destructable mold of soft ductile material for encasing and maintaining the material under pressure during the curing thereof.

A more specific object of the present invention is to provide a method for molding a vulcanizable elastomeric article within a formed destructable ductile soft metal mold. One method for accomplishing this object is to provide two layers of soft ductile material having a layer of unvulcanized elastomeric material therebetween, severing portions of each layer for forming a part having a predetermined shape, placing said part in a suitable die for forming a mold of the soft ductile material while simultaneously encasing and forming an elastomeric article of the desired shape and maintaining said article under pressure therein, placing said mold in a suitable atmosphere for curing the elastomeric material therein and finally destructably removing said mold for providing a molded elastomeric article.

It is another object of the present invention to form an elastomeric article in a destructable mold with a method wherein the steps comprise: filling an annular space between the two concentric tubes of ductile soft material with unvulcanized elastomeric material, for example by tubing. Circumferentially cutting said tubes and material into sections, successively placing said sections in a suitable die for simultaneously forming said material into a shaped article and sealing said formed article within a mold formed from the tubes, placing said mold in a suitable atmosphere for curing the material and finally destructably removing said mold for providing an elastomeric article formed without mold flash.

Further objects and advantages of the present invention will be apparent from the following description reference being had to the accompanying drawings wherein a preferred embodiment of the present invention is clearly shown.

In the drawings:

Fig. 1 diagrammatically shows two layers of metal with a layer of elastomeric material therebetween.

Fig. 2 diagrammatically in section shows the severing of portions of the laminated layers in Fig. 1.

Fig. 3 diagrammatically in section shows a severed article in Fig. 2.

Fig. 4 diagrammatically in section shows a formed annular ring encased within a metal mold.

Fig. 5 is an enlarged end view in cross-section of Fig. 4.

Fig. 6 diagrammatically shows a portion in section of an O-ring as formed without mold flash.

Fig. 7 shows one modification of the invention wherein elastomeric filling is provided within the annular spacing between two metal tubes.

Figure 8:
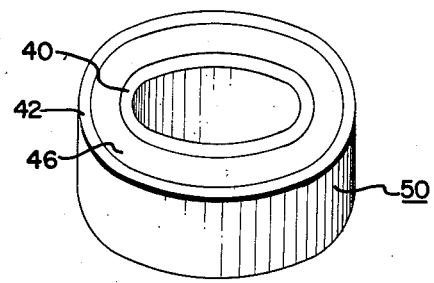

Fig. 8 diagrammatically shows a segment of the article as cut from the part as seen in Fig. 7.

Figure 9:
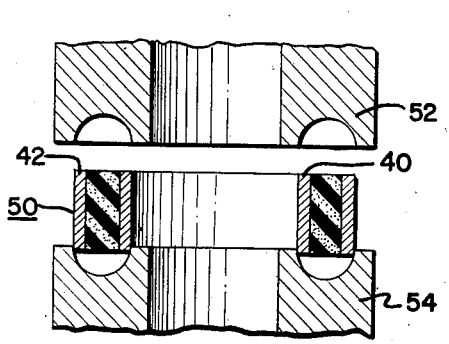

Fig. 9 diagrammatically in cross section shows the article in Fig. 8 positioned in a press.

Figure 10:
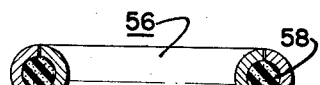

Fig. 10 diagrammatically in section shows the article as formed in the press in Fig. 9.

In the drawings and particularly in Fig. 1, two layers 20 and 22 of soft ductile metallic material are shown with a layer of unvulcanized elastomeric material 24 positioned therebetween to form a composite laminated sheet 26, Fig. 2, when the layers are brought into intimate contact. The laminated sheet 26 is punched or severed by a suitable apparatus, as shown in Fig. 2, wherein a small punch 30 is first used to punch holes 28 and a larger punch 32 a second hole, to form an annulus 34, Fig. 3, having a layer of elastomeric material 24 between two metallic layers 20 and 22.

The laminated annulus 34 is then placed in a suitable forming die, not shown, capable of deforming the layers 20, 22 and 24 into a predetermined shape. In the present embodiment, a mold 36 is formed of metallic layers 20 and 22 and an elastomeric annulus 37 is encased, formed and sealed under pressure within mold 36. It is to be noted that the material of the mold 36 is soft and ductile, preferably lead, tin, zinc, etc., with or without suitable alloying ingredients for example, antimony, cadmium, arsenic, etc., so that the material when deformed within the die will flow under the pressure applied from points having tapering as shown in Fig. 5, for presenting a continuous wall surface within the mold cavity.

After the elastomeric material has been formed and sealed within the mold, it is placed in a retort oven or other suitable heating apparatus wherein a curing temperature is maintained over a predetermined time for curing the elastomeric article 37. Manifestly the material selected for the mold should have a higher melting point than the curing temperatures used so the mold will not melt or deform during the cure of the elastomeric material.

At the conclusion of the curing step, the mold is removed from the heating apparatus and the metallic material forming the mold 36 is stripped from the cured elastomeric material to provide a molded article 37, Fig. 6, having a surface that is without the mold flash normally imparted to molded articles when the conventional methods of molding are utilized.

In Figs. 7 to 10 a modification of the present invention is shown, wherein two metallic tubes 40 and 42 are in concentric relation with an annular spacing 44 therebetween. This spacing 44 is filled in with unvulcanized elastomeric material 46 to provide a composite elastomeric article 48, for example, by use of a tuber, not shown. The composite article 48 is then circumferentially divided into suitable lengths 50 as shown in Fig. 8. These lengths are placed between forming dies 52 and 54, Fig. 9, adapted for forming the lengths 50 into metallic mold 56 having a formed elastomeric core 58 therein, Fig. 10. This mold is adapted for maintaining the elastomeric material under pressure in a suitable curing atmosphere to cure the elastomeric core 58 and thereby form an annulus without mold flash in a manner and method previously described. It is apparent the mold formed as in Fig. 10 may have the mating edges formed to overlap as previously described or sealingly abut, as shown, where the edges may slightly be wiped together for forming a seal which is maintained by the preset applied to the mold material by the die of the press.

The method disclosed will provide an elastomeric article as an O-ring formed in a destructible mold adapted to impart a smooth continuous surface to the formed article. It is manifest articles of various shapes and sizes may be formed according to this method and any surface configuration on the article desired may be achieved if a corresponding pattern or surface is provided on the surfaces of the metal forming the mold and/or if suitable dies are employed to impart the shape or surface design desired. Further, because the pressure imported to the elastomeric material by the forming press is maintained by the mold, the use of the conventional molding presses for maintaining the elastomeric material under pressure is eliminated.

The material forming destructible mold is not lost when the mold is removed from the formed elastomeric article, and the material may be reworked into sheets, tubes, etc., and reused in the method disclosed.

It is apparent the particular article molded is used for the purposes of illustration and various other articles having different shapes and sizes may be molded in a destructible metallic mold found according to a method wherein elastomeric material between two soft ductile layers is encased is formed by a press and maintained under pressure by the formed material of the mold. Further the material forming the mold may be any suitable ductile metal or alloy capable of withstanding the vulcanizing or curing temperatures without melting or chemically combing with either the elastomeric material or atmosphere in the curing process and has the proper ductility and is sufficiently soft for providing a mold for eliminating mold flash on the molded article. The elastomeric material may be organic plastics of the thermoplastic or thermosetting type, wherein the heating effects a cure or natural or synthetic rubbers or mixtures thereof provided with suitable compounding ingredients to effect a desired cure or vulcanization, wherein the curing temperatures are below the softening point of the metal forming the mold.

It is further apparent granular plastic materials may be molded in a destructible mold if the method of mold as outlined includes the use of a sheet of soft ductile material that has pockets preformed therein so uncured granular plastic material may be measured and confined in the pockets when a second sheet of soft ductile material is placed over the first sheet for confining the granular material within the pocket. A suitable mold may then be formed, when the sheets forming the pockets are placed in a suitable forming and severing apparatus adapted to sever the sheets and form a mold having an internal cavity of the desired shape filled with uncured granular plastic material under pressure from the forming press that is maintained by the mold.

While the embodiment of the present invention as herein disclosed, constitutes a preferred form, it is to be understood that other forms might be adopted.

What is claimed is as as follows:

1. In a method for molding an elastomeric article of an O-ring shape, the steps comprising; providing two concentric tubes of soft ductile metallic material having a predetermined spacing therebetween filled with an uncured elastomeric material for forming a composite annular article, circumferentially cutting said article into sections of predetermined length for forming an annulus wherein the tubes form layers that have the surfaces thereof coextensive with the adjacent surface of said filling, placing said annulus between pressure applying dies for deforming the material of said layers and filling for forming an O-ring shaped sealed casing of said layers adapted to maintain the material of said filling under pressure in an O-ring shape, placing said casing in a suitable temperature for curing said elastomeric material, and finally stripping said casing from the cured material.

2. In a method for molding an elastomeric article of an O-ring shape having an uninterrupted external surface, the steps comprising: forming a laminate consisting of an inner layer of uncured elastomeric material and two outer layers each coextensive with the inner layer and formed of a soft ductile metal which has a sufficient thickness to maintain the material of the inner layer under pressure, severing said laminate for forming a laminated annulus which includes a portion of the material of each of the layers, deforming the laminated annulus in a pressure applying means to form an O-ring shaped article having the material of said outer layers forming a sealed casing for the material of the inner layer and for maintaining the inner layer under pressure, removing the annulus from the pressure applying means, heating said annulus to a suitable temperature for curing the elastomeric material in said casing, and finally stripping said casing from the cured material.

3. In a method for molding an elastomeric article of an O-ring shape having an uninterrupted external surface, the steps comprising; forming a laminate consisting of an inner layer of uncured elastomeric material and two outer layers each coextensive with the inner layer and formed of a soft ductile metal of sufficient thickness to maintain the inner layer under pressure, severing said laminate to form an annulus wherein each of the layers thereof is coextensive with the adjacent layer, deforming the annulus with a pressure applying means so the inner layer is formed into an O-ring shape that is sealing encased under pressure by the material of the outer layers, removing said deformed annulus from the pressure applying means, subjecting said annulus to a suitable temperature for curing the elastomeric material in said casing, and finally stripping said casing from the cured elastomeric material.

References Cited in the file of this patent

UNITED STATES PATENTS

| | | |
|---|---|---|
| 1,359,919 | Reardon | Nov. 23, 1920 |
| 1,622,340 | Paeplow | Mar. 29, 1927 |